United States Patent
Do et al.

(10) Patent No.: US 10,467,868 B2
(45) Date of Patent: Nov. 5, 2019

(54) MAGNETIC APPARATUS FOR PROVIDING TACTILE SENSATION

(71) Applicant: CK MATERIALS LAB CO., LTD., Seoul (KR)

(72) Inventors: Seoung Hun Do, Seoul (KR); Hyeong Jun Kim, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 5 days.

(21) Appl. No.: 15/516,141

(22) PCT Filed: Nov. 14, 2014

(86) PCT No.: PCT/KR2014/010978
§ 371 (c)(1),
(2) Date: Mar. 31, 2017

(87) PCT Pub. No.: WO2016/052803
PCT Pub. Date: Apr. 7, 2016

(65) Prior Publication Data
US 2017/0309140 A1    Oct. 26, 2017

(30) Foreign Application Priority Data

Oct. 2, 2014   (KR) .................. 10-2014-0133508
Nov. 13, 2014  (KR) .................. 10-2014-0158038

(51) Int. Cl.
*G08B 6/00*     (2006.01)
*G06F 3/01*     (2006.01)
(Continued)

(52) U.S. Cl.
CPC ............... *G08B 6/00* (2013.01); *A63F 13/24* (2014.09); *A63F 13/285* (2014.09); *G06F 3/016* (2013.01)

(58) Field of Classification Search
CPC ......... G08B 6/00; A63F 13/285; G06F 3/016; G06F 3/01; G06F 3/048; G09B 21/004
(Continued)

(56) References Cited

U.S. PATENT DOCUMENTS 6,535,806 B2 *  3/2003  Millsap .................. B62D 5/006
                                              340/465
8,593,409 B1 * 11/2013  Heubel ................... G06F 3/041
                                              340/407.1
(Continued)

FOREIGN PATENT DOCUMENTS

KR    10-2007-0073125 A    9/2007
KR    1020100082459 A      7/2010
(Continued)

OTHER PUBLICATIONS

Jansen, et al. "MudPad: Tactile Feedback and Haptic Texture Overlay for Touch Surfaces" ITS2010: Displays, Nov. 7-10, 2010, Sasrbrucken, Germany, 4 pages.

*Primary Examiner* — Eric Blount
(74) *Attorney, Agent, or Firm* — Stuart H. Mayer; Mayer & Williams PC

(57) ABSTRACT

The present invention relates to a magnetic apparatus for providing a tactile sensation and, more particularly, to a magnetic apparatus for providing a user with tactile information, by means of changes in viscosity, rigidity and elasticity due to a magnetic field, by using a magnetorheological fluid or a magnetorheological elastiomer. A magnetic apparatus for providing a tactile sensation comprises a tactile sensation provider 110 having magnetic particles 101, wherein the tactile sensation provider 110 provides a user with tactile information by means of a change due to an external magnetic field that has been applied.

7 Claims, 5 Drawing Sheets

(51) Int. Cl.
*A63F 13/285* (2014.01)
*A63F 13/24* (2014.01)

(58) Field of Classification Search
USPC .......................................... 340/407.1, 407.2
See application file for complete search history.

(56) References Cited

U.S. PATENT DOCUMENTS

| | | |
|---|---|---|
| 2007/0211032 A1 | 9/2007 | Ahn et al. |
| 2009/0133976 A1 | 5/2009 | Bose |
| 2010/0141407 A1* | 6/2010 | Heubel ................ G06F 1/163 340/407.1 |
| 2010/0302199 A1 | 12/2010 | Taylor |
| 2013/0229272 A1* | 9/2013 | Elliott ................ G05G 9/047 340/407.2 |
| 2013/0321262 A1 | 12/2013 | Schecter |
| 2014/0104047 A1 | 4/2014 | Bolzmacher |
| 2014/0253302 A1* | 9/2014 | Levesque ............... G08B 6/00 340/407.1 |
| 2014/0317503 A1* | 10/2014 | Lucero ................. G06F 3/01 715/708 |
| 2014/0317522 A1* | 10/2014 | Lucero ................. G06F 3/01 715/744 |
| 2015/0257902 A1* | 9/2015 | Martin ................ A61F 2/6607 623/52 |

FOREIGN PATENT DOCUMENTS

| | | |
|---|---|---|
| KR | 10-2011-0130005 A | 12/2011 |
| KR | 10-2013-0068521 A | 6/2013 |
| KR | 10-2014-0000800 A | 1/2014 |
| WO | 2014/123296 A1 | 8/2014 |

\* cited by examiner

MAGNETIC APPARATUS FOR PROVIDING TACTILE SENSATION

TECHNICAL FIELD

The present invention relates to a magnetic apparatus for providing a tactile sensation, and more particularly, to a magnetic apparatus for providing a tactile sensation, which provides a tactile sensation to a user through a change in viscosity, rigidity, elasticity or the like due to a magnetic field by using a magnetorheological fluid or a magnetorheological elastomer.

BACKGROUND ART

Haptics refer to a technology about tactile sensation and, more particularly, to a technology for allowing a user of an electronic device to feel touch, forces, motion, etc. through a keyboard, a mouse, a joystick, a touchscreen, or the like. Although visual information accounted for most of the information exchanges between electronic devices and people in the past, the haptic technology currently attracts attention with regard to providing more detailed and realistic information.

In general, an inertial actuator, a piezoelectric actuator, an electroactive polymer (EAP) actuator, an electrostatic actuator, etc. are used for the haptic technology. Examples of the inertial actuator include an eccentric motor that vibrates by an eccentric force generated by the rotation of the motor, and a linear resonant actuator (LRA) that maximizes the vibrational intensity by resonant frequencies. The piezoelectric actuator is in the shape of a beam or a disk and is driven by a piezoelectric element whose size or shape changes instantaneously in response to an electric field. The EAP actuator generates vibration by repeated movements of a mass attached to an EAP film. The electrostatic actuator is driven by an attractive force generated between two oppositely charged glass sheets and a repulsive force generated when the glass sheets have charges with the same polarity.

Korean Patent Publication No. 10-2011-0118584 (entitled "Transparent composite piezoelectric combined touch sensor and haptic actuator") discloses conventional haptic devices, and FIG. 1 is a perspective view of a conventional haptic device.

In the haptic device, a layer configured to serve as a sensor and a layer configured to serve as an actuator may be combined into a single module in the form of a composite piezoelectric actuator/sensor cell. Here, FIG. 1 illustrates the cross section of a composite piezoelectric actuator/sensor cell 10 together with associated electrodes 11. The composite piezoelectric cell 10 includes an array of piezoceramic fibers 12 in a structural adhesive 13 such as an epoxy material. Each of the electrodes 11 may be used to send an individual control signal so that each patch of the fibers 12 inserted into the structural adhesive 13 between two consecutive electrodes 11 and 11 can be actuated, thereby exerting a localized haptic effect at the corresponding location. Arrows 14 indicate how the polarized piezoceramic material expands or contracts in response to an applied electric field, and arrow 15 indicates the piezoceramic polarization produced by the electrodes 11.

However, the above-described conventional haptic technology is merely used to provide simple vibrations, and therefore has limitations for emotionally providing various types of tactile sensations or complicated text information. Accordingly, research needs to be conducted on a tactile supply structure capable of effectively providing emotion and complicated information as well as providing simple vibrations.

DETAILED DESCRIPTION OF THE INVENTION

Technical Problem

The present invention is made to solve the above-described problems of conventional devices and it is therefore an object of the present invention to provide a magnetic apparatus for providing tactile sensation capable of providing various types of tactile sensations more sensitively.

Another object of the present invention is to provide a magnetic apparatus for providing tactile sensation capable of providing a user with various tactile feedback by using the physical properties of a magnetorheological fluid or a magnetorheological elastomer.

Another object of the present invention is to provide a magnetic apparatus for providing tactile sensation which includes tactile sensation providers in the shape of a plurality of cells and effectively provides various kinds of tactile information to a user of the apparatus in whole or in part by the strength of a magnetic field.

Technical Solution

The above objects of the present invention are achieved by a magnetic apparatus for providing tactile sensation which includes tactile sensation providers including magnetic particles, wherein the tactile sensation providers are deformed by an externally applied magnetic field and provide tactile sensations to a user.

Advantageous Effects

According to the present invention, various types of tactile sensations may be provided more emotionally.

Furthermore, according to the present invention, various tactile feedback may be given to a user by using the physical properties of a magnetorheological fluid or a magnetorheological elastomer.

In addition, according to the present invention, tactile sensation providers are in the shape of a plurality of cells and effectively provide various kinds of tactile information to a user of the apparatus in whole or in part by the strength of a magnetic field.

EXPLANATION OF REFERENCE NUMERALS

Figure 1:
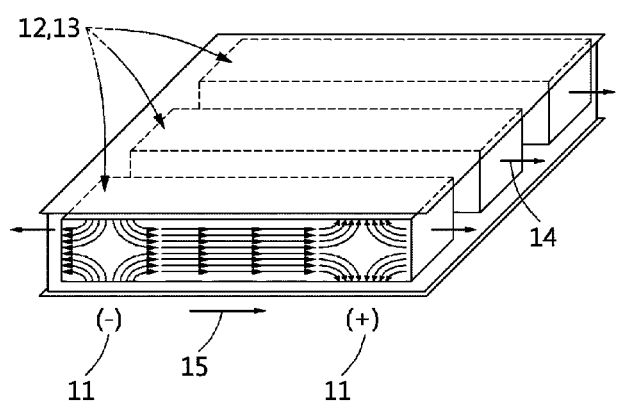
FIG. 1 is a perspective view of a conventional haptic device.

10: composite piezoelectric actuator/sensor cell
100: tactile sensation provider
101: magnetic particle
102: matrix material
120: outer cover
200: magnetic field generator
300: insulator
400: housing
500: power supply unit
600: game device

MODE OF THE INVENTION

The configuration and application of embodiments of the present invention will now be described in detail with reference to the accompanying drawings. The following description discloses one of various patentable aspects of the present invention and corresponds to part of the detailed description of the present invention.

In the following description of the present invention, a detailed description of known functions and configurations incorporated herein will be omitted when it may make the subject matter of the present invention unclear.

Hereinafter, a magnetic apparatus for providing tactile sensation according to the present invention will be described with reference to the attached drawings.

Figure 2:
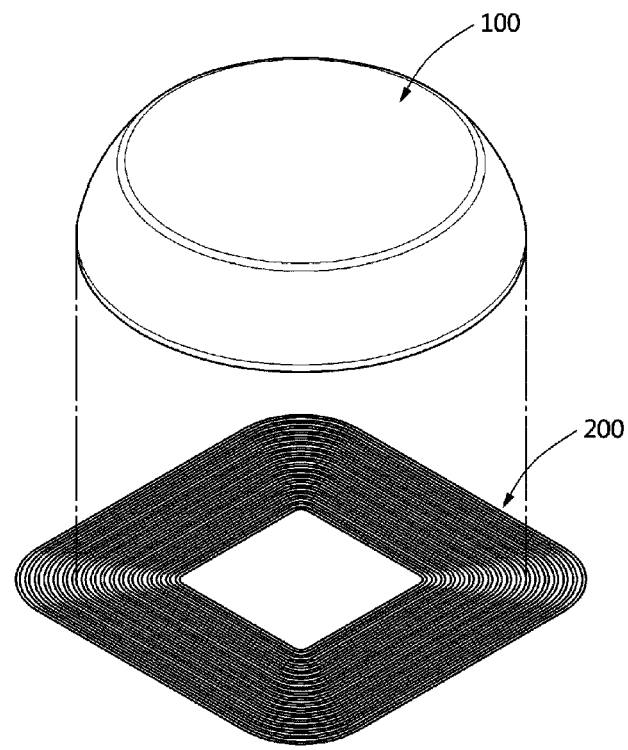
FIG. 2 is a view illustrating the configuration of a magnetic apparatus for providing a tactile sensation according to an embodiment of the present invention.
Figure 3:
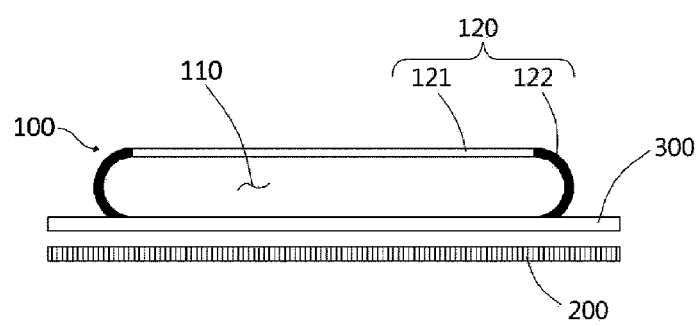
FIG. 3 is a view illustrating a structure in which a tactile sensation provider according to an embodiment of the present invention includes a magnetorheological fluid.
Figure 4:
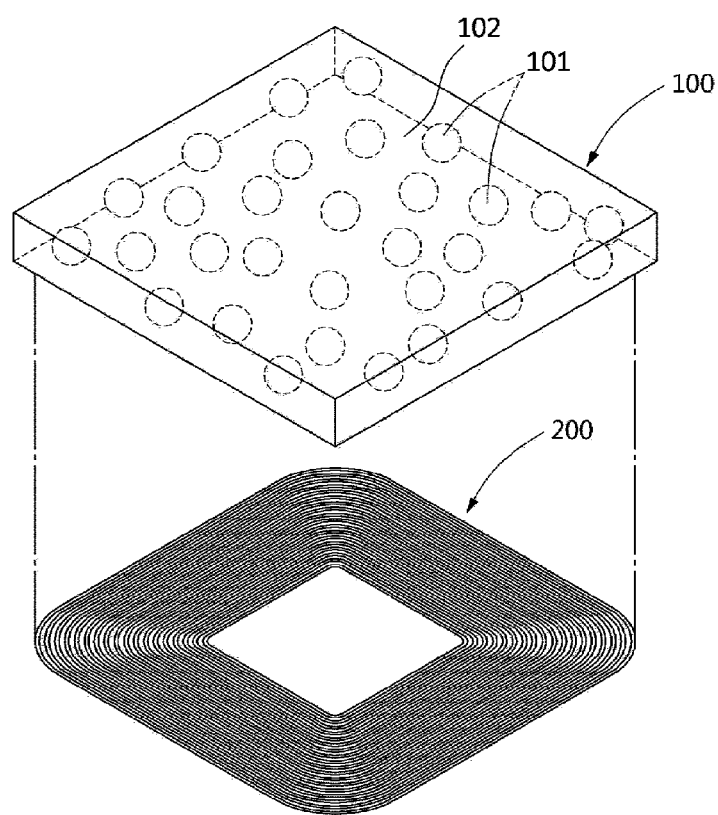
FIG. 4 is a view illustrating a structure in which a tactile sensation provider according to an embodiment of the present invention includes a magnetorheological elastomer.

FIG. 2 is a view illustrating the configuration of a magnetic apparatus for providing a tactile sensation according to an embodiment of the present invention, FIG. 3 is a view illustrating a structure in which a tactile sensation provider according to an embodiment of the present invention includes a magnetorheological fluid, and FIG. 4 is a view illustrating a structure in which a tactile sensation provider according to an embodiment of the present invention includes a magnetorheological elastomer.

Referring to FIGS. 2 to 4, a magnetic apparatus for providing tactile sensation includes a housing 400 (see FIG. 5), a magnetic field generator 200 that is disposed in the housing and generates a magnetic field, and a tactile sensation provider 100 that includes a magnetic particle 101 (see FIG. 4) that interacts with a change in magnetic field.

More specifically, the housing 400 forms the outer shape of the magnetic apparatus for providing tactile sensation, and the magnetic field generator 200 and the tactile sensation provider 100 are provided within the housing.

The magnetic field generator 200 may be a planar coil or a solenoid coil, and a direct current power supply or an alternating current power supply may be applied to the magnetic field generator. The magnetic field generator may generate a magnetic field having different characteristics depending on the type of the applied power supply. For example, when a direct current power supply is applied to the magnetic field generator 200, the magnetic field generator generates a direct current magnetic field, and when an alternating current power supply is applied, an alternating current magnetic field is generated.

The magnetic field generator 200 is disposed on one side of the tactile sensation provider 100, for example, below the tactile sensation provider 100, and the tactile sensation provider may have various shapes in response to a magnetic field generated by the magnetic field generator 200. In particular, when an alternating current magnetic field is generated by the magnetic field generator 200, the tactile sensation provider 100 vibrates, and when a direct current magnetic field is applied, the rigidity of the tactile sensation provider 100 changes.

The magnetic field generator 200 can control the intensity, direction or frequency of the magnetic field, and the intensity (magnitude), direction, frequency, etc. of the change of the tactile sensation provider 100 may change variously according to the intensity, direction or frequency of the magnetic field.

The tactile sensation provider 100 includes a magnetorheological fluid or a magnetorheological elastomer, and may have various shapes such as a hemispherical shape, a quadrangular shape, and a polyhedral shape depending on the devices or positions to which it is applied. Particularly, the tactile sensation provider 100 is affected by the magnetic field generated by the magnetic field generator 200 disposed at the lower part, and may provide various types of vibration or rigidity changes depending on the type, intensity, position or frequency of the magnetic field. Accordingly, the tactile sensation provider 100 may be utilized as a vibration source for giving a vibrational sensation to a user or be applied to a device for providing a tactile sensation to a user.

Hereinafter, the tactile sensation provider 100 will be described in more detail with reference to FIGS. 3 and 4.

Referring to FIG. 3, when a magnetorheological fluid (MRF) is mainly used as a means for providing a tactile sensation of the tactile sensation provider 100, the tactile sensation provider 100 may include a structure that seals the magnetorheological fluid within an outer cover 120 that is made of an elastic body such as rubber, polymer, etc., a magnetorheological elastomer (MRE), or a mixture of an elastic body and a magnetorheological elastomer. A magnetorheological fluid is a suspension of magnetic particles 101, the viscosity of which varies according to the intensity of an external magnetic field, and generally consists of a dispersion of magnetically polarizable particles such as ferromagnetic and ferrimagnetic particles having a diameter of about 0.01 μm to 100 μm. In the magnetorheological fluid, when the magnetic field generated by the magnetic field generator 200 is applied, the magnetized magnetic particles 101 interact with each other to form a chain-like microstructure. The magnetorheological fluid is a controllable fluid having a quick response characteristic and a high yield stress under a magnetic field.

An outer cover 120 is located on the upper portion of an insulator 300 and is divided into a flat portion 121 and bent portions 122. The bent portions 122 are provided on both sides of the flat portion 121 such that a space 110 is formed inside the outer cover. A magnetorheological fluid is sealed in the space 110. The flat portion 121 and the bent portions 122 may be made of an elastic body or a magnetorheological elastomer.

The insulator 300 is disposed between the tactile sensation provider 100 and the magnetic field generator 200 and prevents electric currents from being directly applied to the tactile sensation provider 100.

The tactile sensation provider 100 made of a material including a magnetorheological fluid can provide a vibrational sensation when the internal magnetic particles 101 react in response to the applied alternating current magnetic field and can provide a change in rigidity when the internal magnetic particles 101 react in response to the applied direct current magnetic field. Furthermore, varying the intensity and the frequency of the magnetic field generated in the magnetic field generator 200 may serve to provide various types of vibrational sensations.

Referring to FIG. 4, when a magnetorheological elastomer is mainly used as a means for providing a tactile sensation of the tactile sensation provider 100, magnetic particles 101 such as nano- or micron-sized iron or ferrite particles may be distributed in a matrix material 102 made of rubber or other polymer material. Like the magnetorheological fluid, the magnetorheological elastomer is an elastic body including magnetic particles 101. The magnetorheological elastomer is a controllable elastomer in which the magnetic particles 101 react, in response to a magnetic field when the magnetic field generated by the magnetic field generator 200 is applied, such that the tensile strength, elongation and the like of the magnetorheological elastomer changes physically. Here, the magnetic particles 101 may generally be magnetically polarizable particles such as ferromagnetic and ferrimagnetic particles having a diameter of about 0.01 μm to 100 μm.

Furthermore, like the magnetorheological fluid, the tactile sensation provider 100 made of a material including a magnetorheological elastomer can provide a vibrational sensation when the internal magnetic particles 101 react in response to the applied alternating current magnetic field and can provide a change in rigidity when the internal magnetic particles 101 react in response to the applied direct current magnetic field. Varying the intensity and the frequency of the magnetic field may also serve to provide various types of vibrational sensations.

Figure 5:
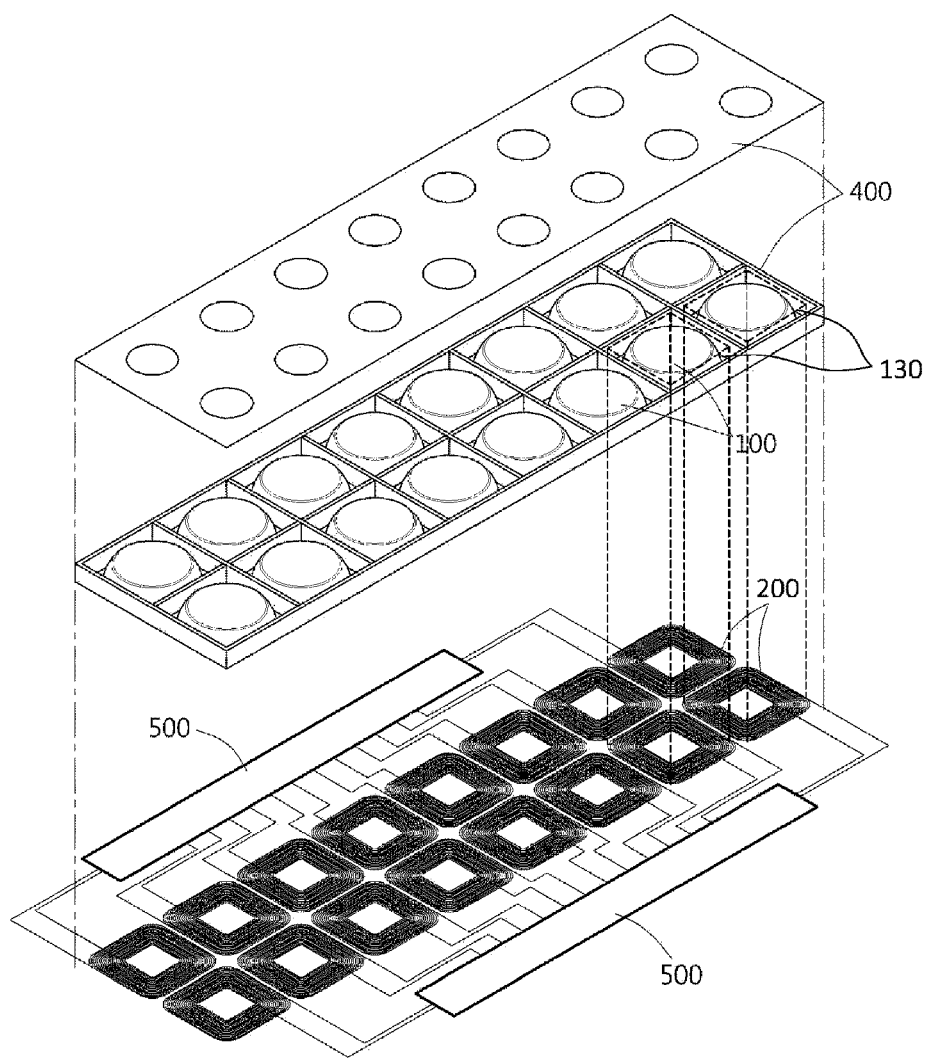
FIG. 5 is a view illustrating a magnetic apparatus for providing a tactile sensation according to an embodiment of the present invention, in which a tactile sensation provider includes a plurality of cells.

FIG. 5 is a view illustrating a magnetic apparatus for providing a tactile sensation according to an embodiment of the present invention, in which a tactile sensation provider includes a plurality of cells.

Referring to FIG. 5, the tactile sensation provider 100 may occupy at least one cell 130 and the cell 130 may be provided in the housing 400. Furthermore, a plurality of housings 400 may be provided and a plurality of tactile sensation providers 100 may also be provided correspondingly. In addition, the magnetic field generator 200 may be a planar or solenoid coil of a size or shape corresponding to the cell 130. A plurality of magnetic field generators 200 may be provided corresponding to the number of the cells 130. Here, the magnetic field generator 200 may be connected in series or in parallel with a power supply unit 500 that supplies a direct current power or an alternating current power, and the power supply unit 500 may be independently connected to a plurality of the magnetic field generators 200.

In particular, a plurality of cells 130 are arranged in the housing 400, and the housing 400 and the cells 130 may form a single layer or a plurality of layers.

The magnetic field generator 200 may generate a magnetic field in all of the plurality of cells 130 such that all of the plurality of cells 130 vibrate or undergo a change in rigidity. On the other hand, a magnetic field may be generated only in some of the plurality of cells 130 to bring about a local vibration or change in rigidity.

Furthermore, the tactile sensation provider 100 occupies a plurality of cells 130 such that not only a simple vibration signal such as an alarm, but also complicated information, which corresponds to the cells, such as texts or geometric figures, may be provided as tactile information. In addition, information such as text may be transferred to a location that contacts a user's skin, thereby effectively transferring secret information that is to be protected.

Figure 6:
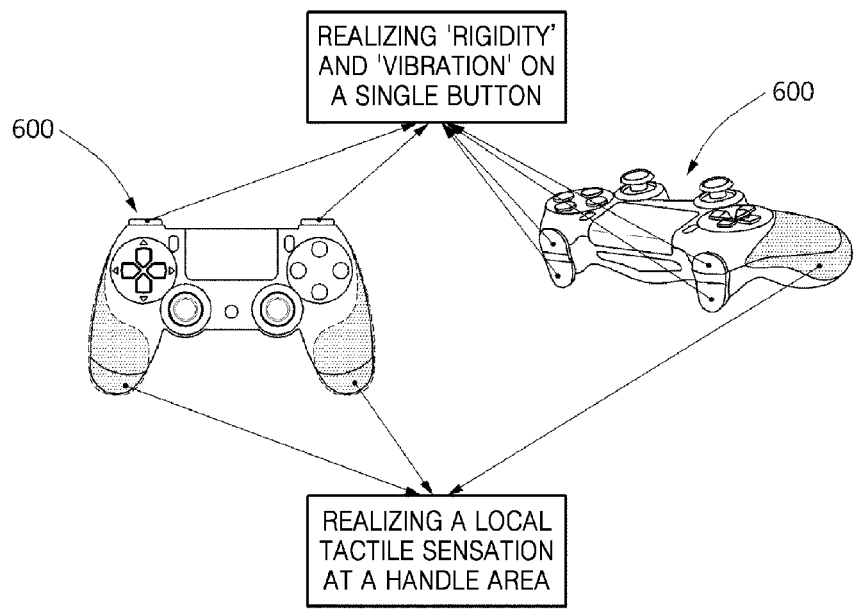
FIG. 6 is a view illustrating an example in which a magnetic apparatus for providing a tactile sensation according to an embodiment of the present invention is applied to a game device.

FIG. 6 is a view illustrating an example in which a magnetic apparatus for providing a tactile sensation according to an embodiment of the present invention is applied to a game device.

Referring to FIG. 6, the magnetic apparatus for providing a tactile sensation is applied to a game device 600 and the like, and can realize various functions of the game device 600. For example, when applied to the buttons of a console including PS4 and other game controllers, the magnetic apparatus for providing a tactile sensation may provide rigidity variations and local vibrations to correspond to various game situations. Also, in First Person Shooter (FPS) games, the magnetic apparatus for providing a tactile sensation may use the rigidity changes and local vibrational sensations to provide the strength of the act of pointing a muzzle, the feeling of pulling a real trigger, and whether or not the target is hit, respectively. Furthermore, during car chases, the magnetic apparatus for providing a tactile sensation may transmit the scratching or collision at the front/rear side or at the left/right side as tactile sensations through the intensity of vibrations or the like, thereby enhancing the user's sense of immersion and realism.

In addition, the magnetic apparatus for providing a tactile sensation may be applied to mobile devices, touchscreen devices, online games, etc. in the information technology (IT) field to provide real-time tactile sensations, applied to driver assistance information feedback systems such as lane departure warning systems, front crash prevention systems, and overspeed protection systems, etc. in the car industry, and also applied to pulsimeters, measurement of the pressure distribution in human teeth, surgical robots, braille books, etc. in the medical field.

With such a configuration, the magnetic apparatus for providing a tactile sensation may provide a user with various tactile feedback by using the physical properties of a magnetorheological fluid or a magnetorheological elastomer. Furthermore, the magnetic apparatus for providing tactile sensation includes tactile sensation providers in the shape of a plurality of cells and effectively provides various kinds of tactile information to a user of the apparatus in whole or in part by the strength of a magnetic field.

Accordingly, the spirit and scope of the present invention should not be limited or determined by the above-described embodiments, and it should be noted that not only the claims which will be described below but also their equivalents fall within the spirit and scope of the present invention.

The invention claimed is:

1. A magnetic apparatus for providing a tactile sensation, the apparatus comprising:
    a tactile sensation provider including magnetic particles,
    a housing and
    a magnetic field generator provided in the housing and generating a magnetic field
    wherein the tactile sensation provider is deformed by an externally applied magnetic field and provides tactile sensations to a user,
    wherein the tactile sensation provider vibrates when an alternating current magnetic field is generated by the magnetic field generator, and
    wherein the rigidity of the tactile sensation provider changes when a direct current magnetic field is generated by the magnetic field generator.

2. A magnetic apparatus for providing a tactile sensation, the apparatus comprising:
    a tactile sensation provider including magnetic particles,
    a housing and a magnetic field generator provided in the housing and generating a magnetic field wherein the tactile sensation provider is deformed by an externally applied magnetic field and provides tactile sensations to a user and, wherein the tactile sensation provider occupies at least one cell, and the magnetic field generator includes a planar or solenoid coil of a size or shape corresponding to the cell.

3. A tactile device in which the apparatus of claim 1 is disposed, to provide vibrations.

4. A tactile device comprising a surface, wherein the apparatus of claim 1 is disposed on the surface, to provide a vibration, tapping or rigidity changes in a portion that is in contact with a user.

5. A tactile device comprising a surface, wherein the apparatus of claim 2 is disposed on the surface, to provide a vibration, tapping or rigidity changes in a portion that is in contact with a user.

6. The apparatus of claim 1, wherein the tactile sensation provider includes a magnetorheological fluid or a magnetorheological elastomer.

7. The apparatus of claim 2, wherein the tactile sensation provider includes a magnetorheological fluid or a magnetorheological elastomer.

* * * * *